United States Patent [19]

Lee

[11] Patent Number: 4,599,684
[45] Date of Patent: Jul. 8, 1986

[54] LIGHT REFLECTOR SYSTEM

[76] Inventor: Richard H. Lee, 761 Panorama Dr., San Francisco, Calif. 94131

[21] Appl. No.: 710,545

[22] Filed: Mar. 11, 1985

[51] Int. Cl.$^4$ ............................................. F21V 7/12
[52] U.S. Cl. .................................... 362/346; 362/217; 362/277; 362/301
[58] Field of Search ............... 362/346, 217, 255, 257, 362/277, 301, 317, 323, 349, 341

[56] References Cited

U.S. PATENT DOCUMENTS

| | | | |
|---|---|---|---|
| 2,194,841 | 3/1940 | Welch | 362/346 |
| 2,341,658 | 2/1944 | Salani | 362/346 |
| 2,864,939 | 12/1958 | Bodian et al. | 362/346 |
| 2,914,657 | 11/1959 | Akely et al. | 362/346 |
| 3,829,677 | 8/1974 | DeLlano | 362/346 |
| 4,174,533 | 11/1979 | Barthes et al. | 362/342 |
| 4,242,725 | 12/1980 | Douma et al. | 362/297 |
| 4,336,576 | 6/1982 | Crabtree | 362/247 |
| 4,388,675 | 6/1983 | Lewin | 362/247 |
| 4,499,529 | 2/1985 | Figueroa | 362/346 |

*Primary Examiner*—E. Rollins Cross
*Attorney, Agent, or Firm*—Harris Zimmerman; Howard Cohen

[57] ABSTRACT

A reflector assembly for fabricating as part of an original light fixture or for retrofitting a light fixture in the field. First (36) and second (52) reflector structures are formed with seams (38,58) about which the various reflector surfaces can be rotated for adjustment with respect to a fluorescent tube (30). A flap (62) and tape strip (74) are accessible through doors (76) for securing the reflectors in the fixture housing (24). A third reflector (178) can also be installed. A composite reflector (188) is formed by joining the respective reflectors with two additional sections (218, 228). The preferable reflector material is cardboard over which is formed a specular surface. For hallways, a reflector structure (240) is formed for mounting reflector surfaces (250) perpendicular to the longitudinal centerline (252) of housing and tube. The foregoing reference numbers in parentheses are provided solely to facilitate quick comprehension; these numbers are not to be used for interpreting the breadth of the Invention defined by the Claims.

36 Claims, 14 Drawing Figures

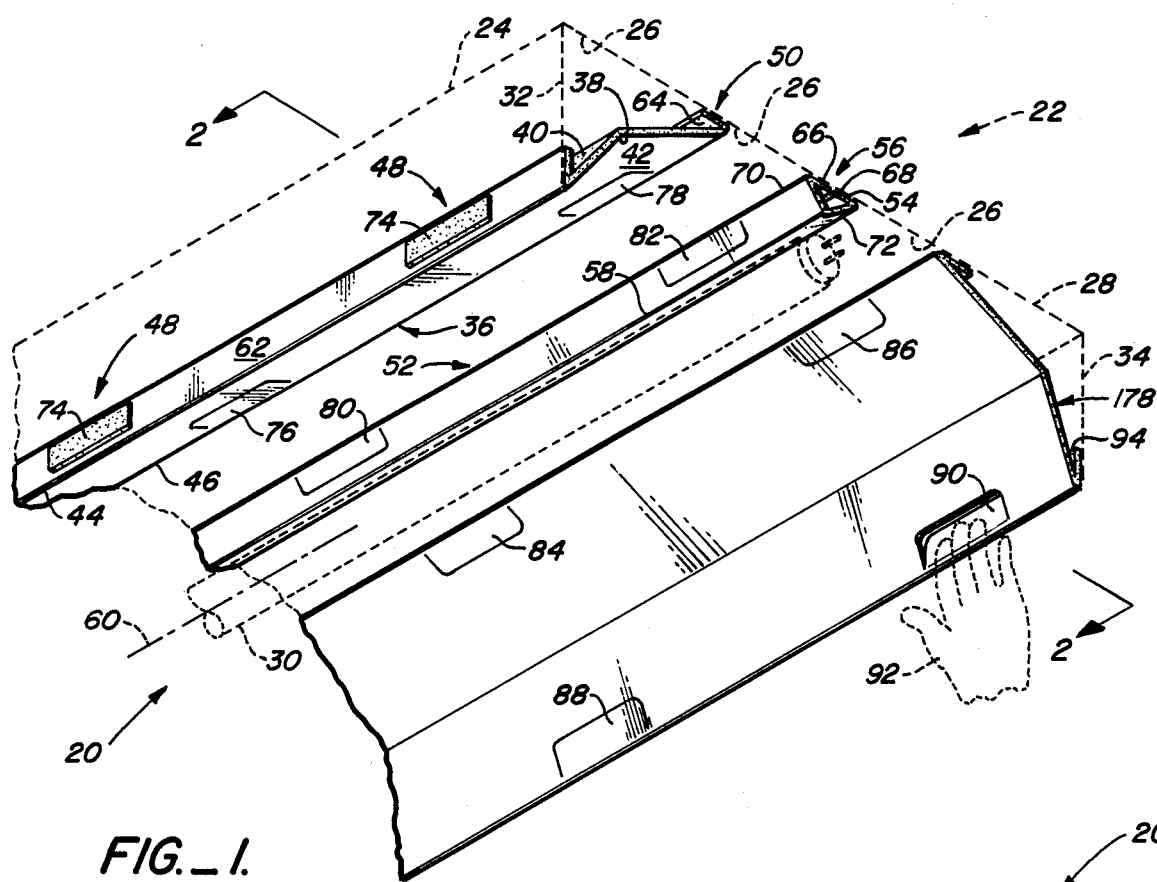
FIG._1.
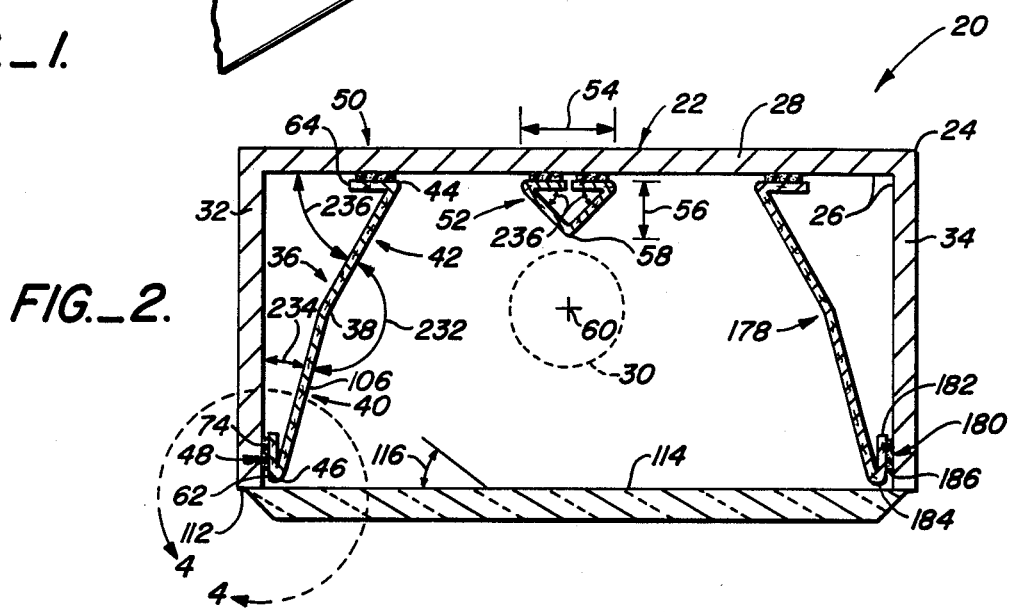
FIG._2.
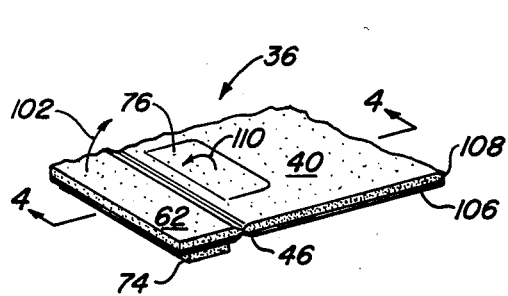
FIG._3.
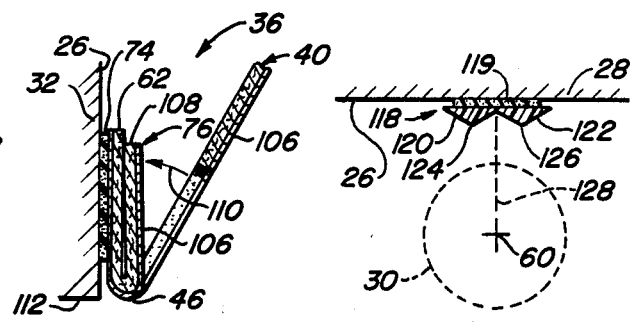
FIG._4.
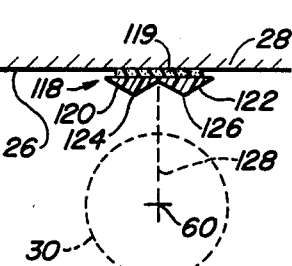
FIG._5.

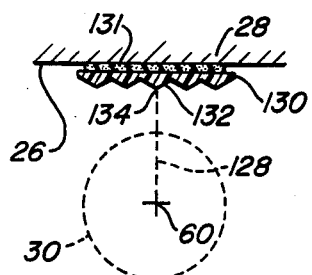
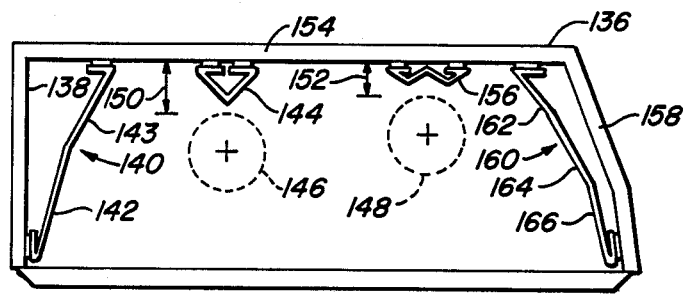
FIG._6.   FIG._7.
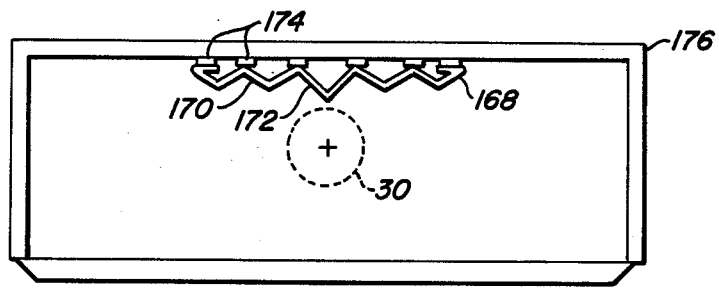
FIG._8.
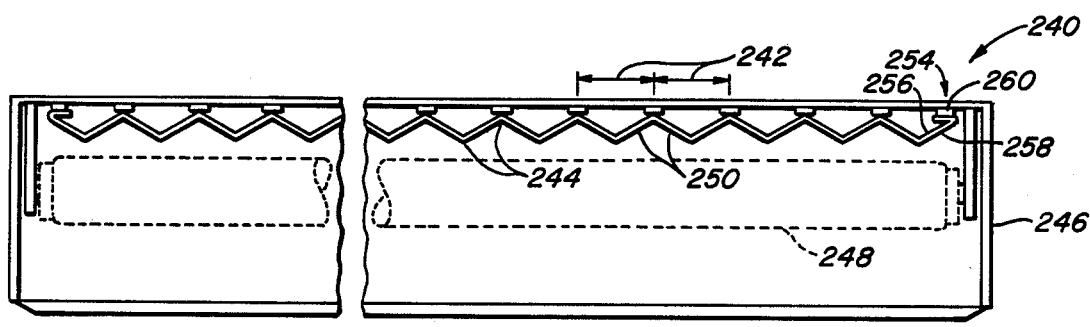
FIG._11.
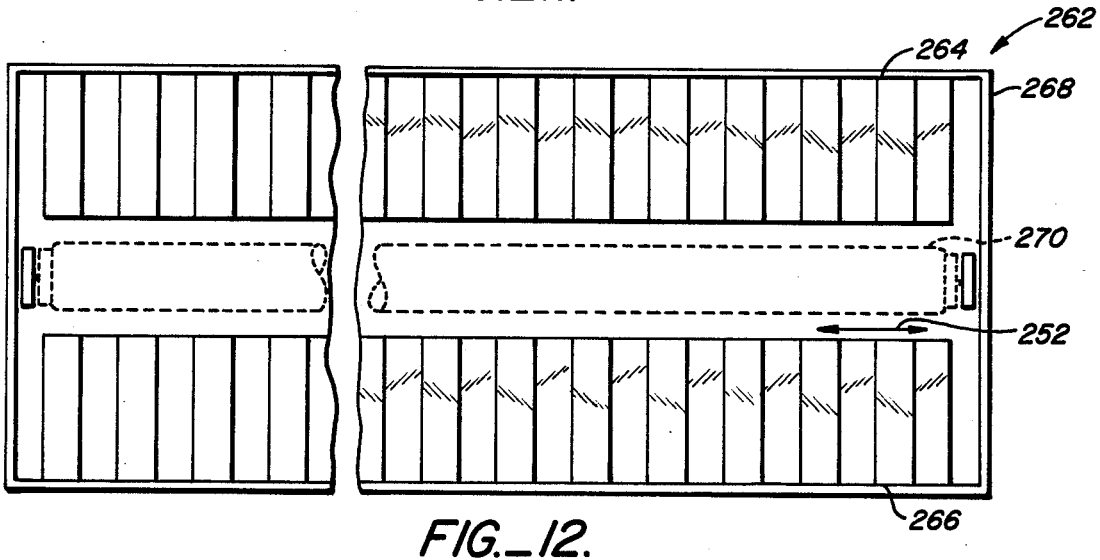
FIG._12.

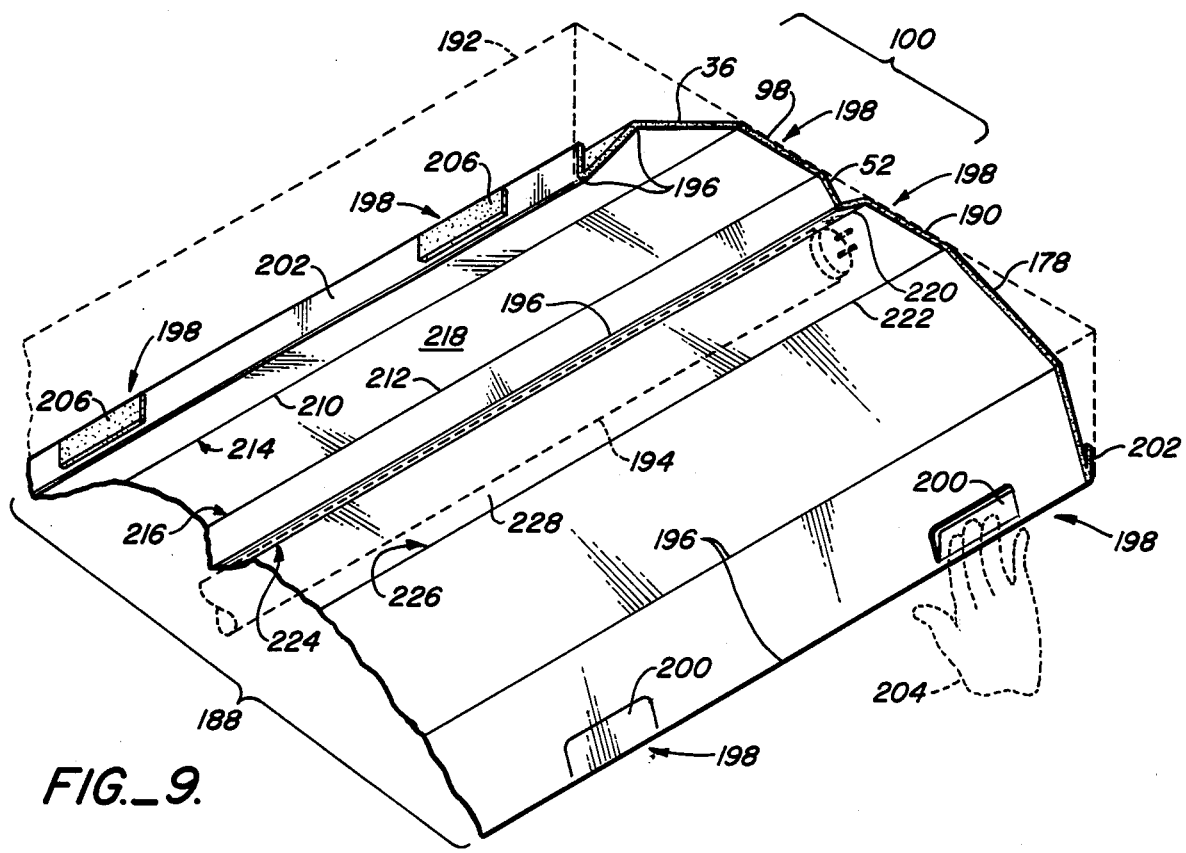
FIG._9.
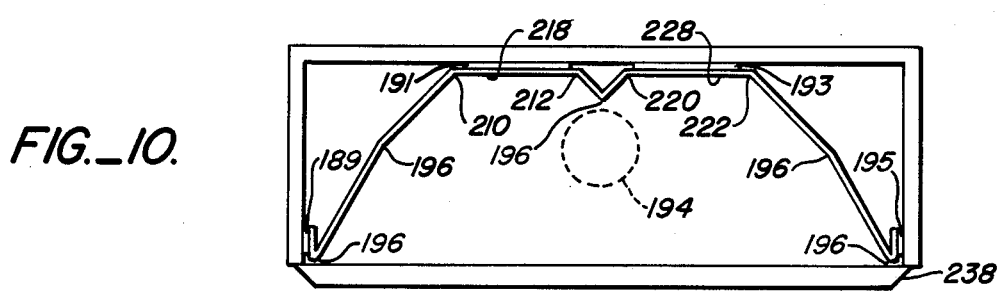
FIG._10.
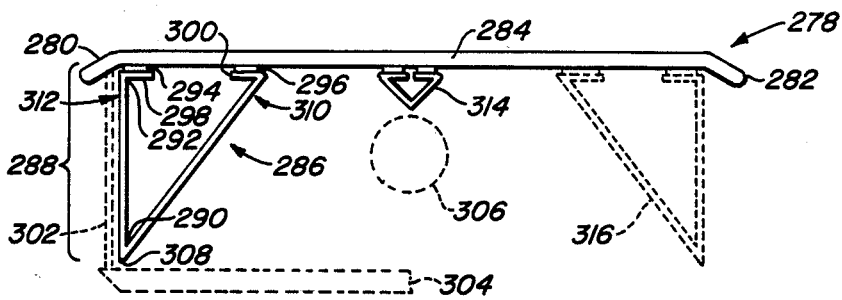
FIG._13.
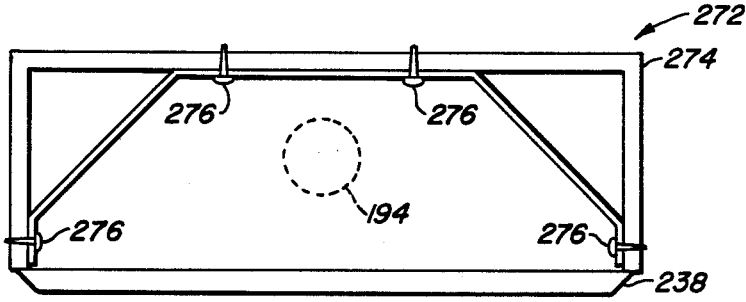
FIG._14.

4,599,684

LIGHT REFLECTOR SYSTEM

FIELD OF THE INVENTION

The field of this invention relates generally to reflectors for reflecting rays of light produced by a light source and directing the light out of a light fixture housing holding the light source, and more particularly to reflectors designed for retrofitting existing fluorescent tube light fixtures to improve energy efficiency with an inexpensive improved reflector structure.

BACKGROUND OF THE INVENTION

Fluorescent lighting fixtures are now in use for providing illumination of large rooms, such as those found in offices and stores, as well as narrow areas such as hallways and stairways. These lighting fixtures can be operated at greatly reduced costs when compared to incandescent light fixtures. Also, fluorescent tubes provide even distribution of light without glare.

However, shortcomings exist in fluorescent lighting fixtures now being used, mainly related to their inefficient use of the available light. These fixtures usually employ translucent covers beneath the fluorescent tubes to diffuse the light evenly over the area of illumination; these translucent covers absorb light, thereby hampering efficiency.

A further deficiency is related to the housings in which the fluorescent tubes or bulbs are mounted for illumination. The housings absorb light directed from the bulb toward the back and sides of the housings. In addition, the geometry of the housings causes light interference patterns which further limits the total amount of light reflected out of the fixture. Quite often the housings are flat and rectangular, with the interior surfaces painted white to facilitate reflection of light outward. A significant amount of light produced by bulbs in multi-bulb housings travels either directly from one bulb to another or indirectly from one bulb to another by being reflected from an interior surface of the housing into another bulb.

The foregoing approaches waste energy. A significant portion of light produced by the tubes is attenuated within the housing, so less light is available to illuminate the area of interest.

Various attempts have been made to alleviate the foregoing problems. Partial solutions are offered by the following U.S. Pat. Nos. 2,194,841; 2,341.658; 2,864,939; 2,914,657; 3,829,677; 4,174,533; 4,242,725; 4,336,576; and 4,388,675.

U.S. Pat. No. 2,194,841 to Welch shows the mounting of a V-shaped reflector behind a fluorescent tube. The surfaces of the reflector direct light from the tube to other reflecting surfaces and then out of the fixture housing. Because of the multiple reflection the light undergoes, light efficiency suffers.

U.S. Pat. No. 2,341.658 to Salani discloses a light reflecting apparatus for focusing light from an intense single light source. The multiple flat reflecting surfaces are intentionally designed to cause the light rays to cross. The overall effect of the flat reflecting surfaces is to provide a reflector having a parabolic longitudinal curvature.

U.S. Pat. No. 2,864,939 to Bodian et al. discloses a shallow luminescent fluorescent light fixture. V-shaped reflectors are placed with their apex behind the fluorescent tubes to reflect light which would usually be lost in a flat fixture without V reflectors. Unfortunately, a significant portion of the light is reflected back into the bulbs, to thereby increase light interference and reabsorption and heat the tubes undesirably.

U.S. Pat. No. 2,914,657 to Akely et al. provides outdoor lighting fixtures suitable for use over areas such as gas filling station pump islands. In this case, V-shaped reflectors are aligned longitudinally in the fixtures so the apex of each V is midway between adjoining fluorescent tubes. Once again, a drawback is that a portion of the light is reflectd back into the tubes, thereby creating inefficiencies.

U.S. Pat. No. 3,829,677 to DeLlano offers a reflecting means used in connection with fluorescent tubes. In this case, a parabolic reflector positioned behind the fluorescent tube is provided with a raised, inverted and smaller parabolic reflector located directly behind the tube. The reflectors are formed of rigid metallic materials which are not adjustable and are heavy to handle and be supported by the light fixture.

U.S. Pat. No. 4,174,533 to Barthes et al. discloses a wave flux concentration reflector in which a first trough-shaped reflector and a second reflector consists of two parabolic portions. The structures are so arranged that the aperture of the emergent beam is controllable. This arrangement is relatively complex and costly.

U.S. Pat. No. 4,242,725 to Douma et al. provides a parabolic reflector in which can be positioned an inverted V reflector with its apex behind an elongated intense light source. The shape of this reflector is determined at the point of manufacture; it is not adjustable in the field for retrofitting. Further, its construction is more complex than the construction of reflectors having flat surfaces.

U.S. Pat. No. 4,336,576 to Crabtree provides a lighting aparatus having less than the conventional number of light sources. The curved surfaces of the light reflector are constructed to reflect a ghost image of a tube into another portion of the light fixture, to thereby create the illusion to a viewer of multiple light sources. It is intended that this will have the psychological effect of convincing a light user there are more light sources than there actually are, to thereby reduce the number of light sources necessary in the fixture. The reflecting surfaces are intentionally designed to cause light rays to converge and cross, thereby creating the ghost tube image. The intended interference patterns, then, are used to advantage.

U.S. Pat. No. 4,388,675 to Lewin provides a lighting fixture having a plurality of inverted V-channels positioned behind fluorescent tubes in a light fixture. One set of channels is located with the apex directly behind a tube. Another set of channels has its members positioned midway between each light tube. All reflecting surfaces are covered with a specular material. The reflectors are permanently affixed to a fixture housing at the point of manufacture.

While the above patents do offer laudable approaches and solutions with respect to the particular situation each addresses, none of them individually or in combination disclose or suggest the invention defined by the appended Claims of this present case. Specifically, the following problems have not been adequately solved by the existing art. Existing light fixtures already mounted in, for example, office buildings and hallways do not lend themselves to easy retrofitting with presently used reflectors. Either the fixtures have built-in reflector surfaces with geometries making retrofitting with existing insert reflectors difficult or impractical, or the reflectors used for retrofitting are costly, cumbersome, limited for use in a particular fixture for which each reflector was designed, and heavy because the typical construction provides a specular metal reflecting surface overlying a base formed from steel.

Because existinq reflector structures are manufactured into one integrated whole, a decision cannot be made in the field to retrofit only part of an existing light fixture. Although light fixtures typically have a uniform design within any one general work area, frequently there is a variation in light fixture construction from one work area to another; therefore, a different retrofitting reflector is required for each differing work area. These reflectors are expensive to manufacture because they are fabricated from steel alloys. Further, they are costly to install because the typical electric drill and screws used to affix insert reflectors to a fixture involve a substantial labor and materials cost. And once screwed into place, the reflectors require a significant amount of labor time to be removed from the light fixtures if that is desired.

The type of reflector useful for one work area is often not efficient for a differing work area, even if the light fixtures have the same geometry in all work areas. For example, a hallway or stairwell presents a different lightinq situation than that found in an office space. In a hallway, it is preferable to direct a large percentage of the light to illuminate most brightly the hallway width at the floor. In contrast, in an office area it is preferable to spread light evenly throughout the area so the lighting level is constant throughout the work area.

These are only a few of the problems which have not been adequately resolved by previous approaches. For this reason it became necessary to devise the invention disclosed and claimed herein.

SUMMARY OF THE INVENTION

Solutions and advantages are offered by this invention which resolve many of the deficiences still existing in the current technology. This invention provides an inexpensive, lightweight, modular system for retrofitting existing lighting fixtures. Also, the reflector structure of this invention can be included in the fabrication of an original light fixture in the factory. Because this novel reflector is divided into individual and different reflector dimensions, the reflectors can be retrofitted in the field into existing light fixtures having a wide variety of dimensions. The manufacturing materials are inexpensive, and require very little labor time for installation; the only tool required is a cutting device such as a knife or scissors.

Further, this invention offers a flexible reflector structure with reflector surfaces which are hinged together for pivoting with respect to other reflector structures. With a minimum of reflecting impacts, lightrays from a fluorescent tube exit the light fixture housing with a minimum number of impacts with other reflecting surfaces and with minimum interference with other light rays. The reflector can be easily installed into asymmetrical light fixtures. Additional solutions, features and advantages of this inventive reflector structure will become evident by reading the examples illustrated in the Detailed Description below.

Broadly summarized, the invention provides a reflector assembly formed for retrofitting an existing fluorescent tube light fixture to improve the light emitting characteristics of the fixture. The light fixture includes a housing having generally outwardly directed light reflecting interior surfaces. The housing has a top which resides behind the tubes when the tubes are in the fixture, and a first side and a second side both extending outwardly in a similar direction away from the opposite sides of the base.

The inventive reflector assembly comprises a first reflector structure which is divided along a common edge or seam into at least two smaller sections. The common edge forms a straight hinge-like joint aligned generally parallel to one of the sets the opposite outside edges of the reflector structure. One of the opposite outside edges is formed with means for securing the edge against the housing top. The other outside edge is formed with means for securing the edge against one of the housing sides. This arrangement leaves the hinge-like joint free to be translated during installation (and removal) toward and away from the housing top and sides. This causes light from the tube hitting the first reflector structure to be reflected out of the housing without going back into the tube. Further, the light experiences a minimum number of impacts with the reflecting surfaces inside the housing.

The assembly also comprises a second reflector structure, formed with a base away from which extends a ridge member having a V-shaped cross-section ending in a flexible hinge-like seam or ridge edge. The ridge edge is parallel to the centerline of the fluorescent tube when the tube is mounted in the housing. The second reflector structure is attachable with its base against the housing top. and positionable so the ridge edge underlies the tube centerline on a vertical line drawn from the tube centerline to the housing top.

Additional features offered by the invention are described by example below and defined in the Claims.

DETAILED DESCRIPTION OF SPECIFIC EMBODIMENTS

This Detailed Description, which incorporates the accompanying Drawings, briefly described below, offers specific example(s) (i.e., Embodiments) of how to practice the Invention, but it does not actually define the Invention. Instead, the Invention is defined by the numbered paragraphs of the appended Claims. This Detailed Description sets forth the best mode(s) presently contemplated by the inventor for making and using the claimed Invention. Further, the Detailed Description is intended to facilitate through example the comprehension of the Invention defined in the Claims.

BRIEF DESCRIPTION OF THE DRAWINGS

FIG. 1 is a bottom orthogonal view of embodiments of the invention when viewed looking upward into a light fixture housing suspended for example from a ceiling;

FIG. 2 is a side elevation cutaway section view taken along line 2—2 of FIG. 1;

FIG. 3 is an enlarged cutaway orthogonal view of FIG. 2 at section 4—4 showing details of structure formed for mounting the reflector of this invention in a light fixture housing;

FIG. 4 is an enlarged elevation view of FIG. 2 at section 4—4 showing the FIG. 3 structures employed to mount the reflector;

FIG. 5 is a side elevation view showing a reflector construction adjacent a light tube;

FIG. 6 is a side elevation view showing a variation of the FIG. 5 reflector construction;

FIG. 7 is a side elevation view of various reflector shapes formed for different reflector requirements within a housing having various geometries;

FIG. 8 is a side elevation view of another variation on the FIG. 5 and 6 reflector constructions;

FIG. 9 is a side elevation sectional view showing an integrated composite reflector;

FIG. 10 shows a side elevation cutaway view of FIG. 9;

FIG. 11 shows a side elevation cutaway view according to a reflector useful for a hallway;

FIG. 12 shows a bottom view of a variation on FIG. 11;

FIG. 13 shows a reflector formed for securing to a light housing having shortened sides extending away from the housing top; and FIG. 14 shows a side view according to conventional reflectors.

Overview

As broadly stated, using the language of the Claims, this Invention offers. as for example in FIG. 1, a reflector assembly 20 formed for retrofitting an existing fluorescent tube light fixture 22 to improve the light emitting characteristics of the fixture. Or, the reflectors can be fabricated along with the housing at the factory. Fixture 22 includes a housing 24 having generally outwardly directed light reflecting interior surfaces 26 including a top 28, which resides behind the tubes 30 when the tubes are in fixture 22, and a first side 32 and a second side 34 both extending outwardly in a similar direction away from opposite sides of top 28.

Reflector assembly 20 comprises a first reflector structure 36, divided along a common edge 38 into at least two smaller sections 40 and 42. Common edge or seam 38 forms a straight hinge-like joint which is aligned generally parallel to one of the sets of the opposite edges of the first reflector structure, for example, edges 44 and 46. A least one of these opposite outside edges, 44, 46 is formed with at least one means for securing, indicated at 48, the edge (in this case, edge 44) against housing top 28. Similarly, the other outside edge, in this case edge 46, is formed with means for securing (indicated at 50) the edge 46 against one of the housing sides, in this case housing first side 32.

This arrangement leaves the hinge-like seam or common edge 38 free to be translated toward and away from housing top 28 and housing sides 32 and 34. Light from tube 30 hitting first reflector structure 36 is reflected out of housing 24 without going back into tube 30, and so the light experiences a minimum number of impacts with the reflecting surfaces inside houses 24.

Reflector assembly 20 further includes a second reflector structure 52, formed with a base 54 away from which extends a ridge member 56 having a V-shaped cross-section ending in a flexible hinge-like seam or ridge edge 58. Ridge edge 58 is parallel to the centerline 60 of fluorescent tube 30 when tube 30 is mounted in housing 24. Second reflector structure 52 is attachable with its base 54 against housing top 28, and positionable so ridge edge 58 underlies tube centerline 60 on a vertical line drawn from tube centerline 60 to housing top 28.

The foregoinq applies for a rectangular housing with a flat top and a (at least initially) rectangular reflector. However, other geometries for both are contemplated. For example, the housing can have a slightly concave roof, in which case the sides of the reflectors adjoining the roof are preferably formed as curved edges for a flush fit. In this case, seam 38 will be aligned parallel to the centerline of the reflector geometry.

System Details

Additional details are provided by the inventive reflector assembly 20 to further enhance its usefulness.

FIGS. 1-4 Embodiments

FIGS. 1 and 2 show that first reflector structure 36 preferably has a flat elongated rectangular geometry, divided by common edge or seam 38 into at least two smaller sections 40 and 42 also having a flat elongated rectangular geometry. Common edge 38 is aligned to be parallel to two of the opposed edges, in this case edges 44 and 46, of first reflector structure 36. This rectangular geometry is selected because the majority of light fixtures already installed in buildings in the field requiring retrofitting have a rectangular housing.

For attaching the various reflectors of reflector assembly 20 to the interior of housing 24, at least one flap 62 and preferably a plurality of flaps 62, 64, 66 and 68, is hingeably secured to the edges of the reflectors. For example, flap 62 is hingeably secured along at least one outside edge 44 of at least one of the first reflector structures 36. Likewise, flap 64 is hingeably secured along edge 46. For second reflector structure 52, flap 66 is hingeably secured along edge 70 and flap 68 is attached along edge 72. The flaps are formed to be engaged by a securing means such as double face adhesive tape 72, which is sandwiched between flap 62 and the appropriate housing surface, in this case first side 32.

For easy installation, at least one hinged access door 76 is formed into at least one of the first and the second reflector structures, in this case first reflector structure 36, toward outside edge 46 proximate flap 62. Door 76 provides access to flap 62 at least while the flap is being joined with tape 74 to housing side 32. The surface of door 76 is preferably the same specular material found on the surface of the reflector structure in which it resides. Many doors are included, as shown at 78, 80, 82, 84, 86, 88 and 90. In use, the fingers of a hand 92 press against for example door 90 and push on the top of an underlying flap 94, causing it to in turn mash a tape strip into contact with the interior surface of the housing 24, thereby securing a reflector structure in the housing.

Because first reflector structure 36 and second reflector structure 52 are separate reflector members, each can be provided with specular reflecting surfaces. Between reflectors 36 and 52 can be incorporated the usually non-specular white painted interior surface 96 of housing 94. Surface 96, which diffuses light in all directions, can be used in cooperation with the specular surfaces of reflector structures 36 and 52, for an optimum mix of various reflectors. Or alternatively, as shown in FIG. 9 (discussed in detail elsewhere), first and second reflector structures 36 and 52 are joined together along a common integrating edge member 98 to form a single integrated reflector structure 100.

FIGS. 1 and 2 also show the preferable arrangement, wherein housing top 28, housing sides 32 and 34, the reflecting surfaces of first reflector structure 36, edges 44 and 46, common edge or seam 38, the reflecting surfaces of the second reflector structure 52, base 50, ridge edge or seam 58 and tube 30 are all alignable to be parallel to one another.

FIGS. 3 and 4 show examples of the interaction among the parts shown in section 4—4 of FIG. 2 when mounting a reflector structure in the housing. FIG. 3 shows one configuration for reflector 36 as it arrives in the field after shipping, with flap 62, door 76 and section 40 all lying in the same plane. In preparation for installing reflector 36 in housing 24, tape strip 74 is pressed into binding contact against the specular surface on flap 62. This is a desirable feature offered by this invention; reflectors can be shipped in a flat configuration, and then folded in the field at the point of use into the three dimensional geometry desired for installation in a light fixture.

The next step is to fold flap 62 in the direction of arrow 102 toward section 40 until it resides as shown in FIG. 4. After reflector 36 has been moved into housing 24 as shown in FIG. 2, the fingers of the installer can be pressed against reflecting layer 106 overlying base material 108 of reflector 36. Preferably base material 108 is fabricated from a cardboard-like substance such as cardboard, press board or corrugated board; these materials are inexpensive, lightweight, and easily manipulated by hand. Flap 76 moves in the direction shown by arrow 110, to stop against flap 62 which by now is sandwiching tape 74 against inside surface 26 of first side 32. After the installer presses firmly to cause tape 74 to adhere to surface 26, the installer can remove his fingers to permit door 76 to move in the opposite direction of arrow 110 until coplanar with section 40.

This installation method does not require tools other than some form of cutter for cutting tape sections 74 into various desired lengths. The installer does not have to use tools such as electric drills, screwdrivers, screws and the like. Installation is therefore fast and inexpensive.

Further, because flap 62 can be folded back. outside edge 46 of reflector 36 can be positioned to be in the same horizontal plane as bottom edge 112 of housing 24. This is advantageous; light from tube 30 impacting reflecting layer 106 is reflected to encounter a translucent diffuser 114, if used, at at angle 116 which is more than about 30° above a horizontal plane defined by the interior surface of diffuser 114. If light rays from tube 30 intersect diffuser 114 at an angle less than about 30° from the horizontal, then light rays are undesirably reflected by the interior diffuser surface back into housing 24. This problem exists for fixtures such as those shown in FIG. 2 having housings 24 with vertical sides 32 and 34 exposed to tube 30. Light from tube 30, without the reflectors of this invention, will bounce off the interior surface of side 32 such that some of the light will be reflected by diffuser 114 back up into housing 24. However, this inventive reflector eliminates this problem.

FIGS. 1 and 2 show the flexibility of configurations offered by reflector assembly 20. The specular surfaces of the various inventive reflectors can be interspersed with light diffusing reflective surfaces 26 typically provided on the interior of housing 24. As in FIG. 2, a portion of light diffusing reflective surfaces 26 can be left exposed as shown between first reflector 36 and second reflector 52.

As is illustrated in FIG. 2, the various intercept angles such as at 230, 232 and 234 between the various reflector surfaces, and the reflector surfaces and the housing, are selected to maximize the amount of light reflected out of the housing, and to minimize the amount of light experiencing multiple collisions with the reflective surfaces and the tube. Regarding second reflector 54, it has been found that an intercept angle 236 is preferably either about 30° or about 45°, depending on the vertical distance between tube 30 and housing top 28 as well as the number of V sections comprising second reflector structure 54. Generally, it has been found that about a 45° angle at 236 is preferable in a single V section as in FIG. 2, and that about a 30° angle is preferable in multiple V configurations as in FIGS. 5-8 described below.

FIGS. 5-8 Embodiments

FIGS. 5-8 illustrate some of the many configurations possible for second reflector structure 22. In FIG. 5, reflector 52 is formed into a reflector 118 having at least two ridge members 120 and 122. Tape strip 119 secures reflector 118 in the housing. Reflector 118 can be formed from an extruded plastic strip about 1 inch in width onto which is deposited a metallized reflective surface. Each ridge member 120 and 122 has a V cross-section ending at their respective outermost point with two parallel ridge edges 124 and 126, which in turn are parallel to tube centerline 60. FIG. 5 shows ridge members 120 and 122 as having substantially identical cross-sections, and with each member spaced apart an equal distance on opposite sides of a vertical line 128 running from tube centerline 60 to housing top 28.

In another configuration illustrated in FIG. 6, second reflector structure 52 takes the form of an extruded plastic reflective strip 130 having multiple V-shaped reflecting surfaces. In this case, the central V-shaped structure 132 has a ridge edge 134 secured with tape directly underlying (on a vertical line) tube centerline 60.

FIG. 7 shows the flexibility of being able to select a particular reflector configuration according to the dictates imposed by the geometry of an asymmetrical housing 136. For a vertical wall 138, reflector 140 can be divided into two smaller rectangular sections 142 and 144. A second reflector 144 can be used as above. However, if two tubes 146 and 148 are at different distances 150 and 152 away from housing 154, then the second reflector structure can take the form of reflector strip 156 having a form similar to reflector 118 shown in FIG. 5. Further, if housing 136 has a non-vertical wall 158, then reflector 140 may take the form of a reflector 160 having three sections 162, 164 and 166. Reflector 160 is described in further detail elsewhere in this specification.

FIG. 8 illustrates that second reflector structure 58 can take the form of a reflector 168 having reflector channels of differing V-shaped cross-sections, as with V structures 170 and 172. In this construction, reflector 168 would be in the form of folded reflective cardboard attached with tape strips 174 inside housing 176.

FIGS. 1 and 2 Additional Embodiment

FIGS. 1 and 2 also illustrate that a third reflector structure 178 can be installed toward the right side, or second side 34, of housing 24. Reflector 178 is substantially identical to first reflector structure 36, is constructed to fit into a portion of housing 24 opposite reflector 36, and is formed to be secured into housing 24 with third means for securing 180 which is substantially identical to the first securing means 48 for attaching reflector 36 into housing 24. That is, third securing means 180 can take the form of a hingeable flap 182 hingeably attached to an outside edge 184, for folding back and taping with tape strip 186 against housing side 34.

FIGS. 9 and 10 Embodiment

FIG. 9 shows a composite reflector structure 188; this represents a construction made possible by coupling reflectors 36, 52 and 178 together with rectangular edge members 98 and 190. This may be a preferable construction for the case where composite reflector 188 is being fabricated to meet a specific engineering specification for retrofitting a large number of identical light fixture housings 192, all of which are related in the same way to fluorescent lights such as a tube 194. Because reflector 188 in this case is fabricated to specification, much less flexibility is required of the various hinges 196; the relationship among the relecting surfaces would be substantially established at the factory..Field installation can be faster because an installer would not have to adjust the relation among the reflecting surfaces to get the desired light reflection pattern.

Reflector 188 would be secured in housing 192 at points 198 by sandwiching double face adhesive tape strips between the reflector and the interior surfaces of housing 192. As before, a plurality of hinged doors 200 are provided adjacent the various flaps 202; the hand 204 of an installer can press past doors 200 and push against flaps 202 for securing the various tape strips 206 against the interior surfaces of housing 192.

The FIG. 9 embodiment, unlike for example the FIGS. 1 and 2 embodiments, does not include doors 206 toward the center of the reflector for securing composite reflector structure 188; doors 206 are not required at the center to facilitate installation. In FIG. 9, first reflector 36 and second reflector 52 are hingeably joined along a respective first integrating seam 210 and a second integrating seam 212, to respective first and second opposite sides 214 and 216 of a first integrating member 218. Likewise, the second and third reflectors 52 and 178 are hingeably joined along a respective third and fourth integrating seam 220 and 222 to the respective third and fourth opposite sides 224 and 226 of a second integrating member 228. The effect is that all three of reflectors 36, 52 and 178 together, when joined with first and second integrating members 218 and 228, form the single integrated composite reflector 188.

Integrating members 218 and 228 are secured to housing top 208 by sandwiching tape strips (visible in FIG. 10 as 189, 191, 193 and 195) as before between the back of the integrating members and the interior surface of the housing top. Pressure by the installer is exerted against integrating members 218 and 228 to press them into secured adhesion with housing top 208. Access doors such as doors 200 are therefore not required in this construction.

FIG. 10 is a side elevation view of the FIG. 9 embodiment, with the addition of a diffuser 238 which is often found at the field and consists of translucent plastic.

FIGS. 11–13 Embodiment

FIG. 11 shows an embodiment which is particularly useful for narrow long passageways such as hallways and stairwells. It calls for a single reflector structure 240 formed into a plurality of V-shaped sections which are joined together in series in accordion-like fashion. Reflector structure 240 is hingeably flexible about a plurality of seams 244 to be horizontally expandable and compressible. Further, reflector structure 240 is positionable longitudinally in the light fixture housing 246 in light reflecting relation with tube 248 such that the reflecting surfaces 250 of the V-shaped sections 242 are aligned to be substantially transversely perpendicular to the horizontal axes 252 of both housing and tube.

Also included is mounting means as at 254 which is formed for removably securing reflector 240 in housing 246. As before, reflector 240 is constructed of a lightweight flexible cardboard-like base material and the like, over which a specular material 258 lies. Mounting means 254 takes the form of a double face adhesive material 250, fabricated for sandwiching between reflector structure 240 and housing 246.

As shown in FIG. 12, the single reflector structure 240 of FIG. 11 can easily take the form of a dual reflector structure 262 in which separate reflector sections 264 and 266 are mounted in housing 268 on either side of a tube 270. FIG. 12 is a view looking directly into housing 268 from its open side.

FIG. 13 shows another structure for another type of fixture housing frequently encountered in the field, wherein very short sides as at 280 and 282 barely extend away from housing top 284. In this situation, sides 280 and 282 are too short to provide structural support for a reflector structure 286. As can be seen by comparing the FIG. 13 reflector 386 to the FIG. 2 reflector 36, the reflector 286 differs by (1) having a nonbending straight reflecting surface extending between flap 300 and edge 308, and (2) the addition of an extending leg 288 formed into an outside portion of reflector 286.

As in the preceding embodiments, hingeable seams 290 and 292 are provided for folding reflector 286 into the geometric shape desired. Strips of double face foam adhesive tape 294 and 296 secure flaps 298 and 300 to housing top 284.

An advantage of the geometry of reflector 286 shown in FIG. 13 is that the reflector when mounted is inherently rigid; further, it can be placed immediately adjacent a support, such as a rod 302, which holds the diffuser 304 adjacent housing 278. This permits reflector 286 to be spaced as far away as possible from a light tube 306, to thereby permit the reflector surfaces of reflector structure 286 to be placed for maximizing the amount of light reflected out away from housing 278. In order to maximize the amount of reflected light, it is preferable to position reflector edge 308 as close as possible to diffuser 304. As in previous embodiments, access doors are provided at 310 and 312 to facilitate access doors are provided at 310 and 312 to facilitate access to flaps 298 and 300 by the hand of an installer (see FIGS. 1, 4 and 9). As before. additional reflectors such as second reflector 314 and third reflector 316 can be taped securely into housing 278.

FIG. 14 shows a previous approach to providing a reflector structure for a light fixture. Reflector 272 is typically formed of metal into a rigid structure which is fabricated to detailed dimensions for a particular housing 274. Therefore, reflector 272 is not adjustable; it must be installed with all reflecting surfaces in the same orientation as when originally manufactured. Screws 276 are used for mounting reflectors 272 in housing 274. This requires extra labor and materials cost, because it takes time to install screws with an electric drill or a screw driver, and it costs money to acquire these various tools of installation.

Further, because these conventional reflectors 272 are fabricated in one large piece rather than in several smaller pieces, the reflectors lack the flexibility offered by the present invention. This invention, by providing separate reflectors as for example reflectors 36, 52 and 178, permits each reflecting structure to be instaled separately, thereby offering a variety of installation choices to an installer in the field. Also, existing reflectors are expensive; for example, the most commonly used single unit metalic reflectors cost about $45–$50. However, the present invention will cost approximately $10–$15 for the three reflectors 36, 52 and 178 which are anticipated to be required in the majority of light fixtures.

This reflector system also offers an inexpensive, simple, tool-free method for improving the light reflecting capability of a light fixture. This method can be employed both at a factory to produce a fabricated housing including reflectors, and can also be used in the field to retrofit existing housings with new reflectors. The method contemplates an elongated rectangular housing 24 for holding elongated fluorescent tubes 30 which are longitudinally mounted in the housing.

The method comprises the steps of forming a first and a second reflector structure 36 and 52 by forming a specular surface on a cardboard-like base material. By folding, first reflector 36 is divided into at least two central rectangular sections 40 and 42. The sections have specular surfaces, and are joined along a hinge-like first seam or common edge 38 which is parallel to at least one pair of the free edges 44 and 46 of the two central rectangular sections 40 and 42.

The method includes the step of adjustably mounting first reflector structure 36 in housing 24 to be aligned with the two free edges 44 and 46 which are parallel with the first seam 38, or common edge, and which are also parallel with the housing sides 32 and 34 and housing top 28. One of the free edges 44 and 46 is secured to top 28, and the other of the free edges is secured to a respective side. First seam 38 is not secured, and is free to be moved toward and away from the top and the side.

Folding of the second reflector structure 52 forms it into a member having at least one V-shaped cross-section, with the closed point of the V forming a hinge-like second seam or ridge edge 58. Adjustable mounting of second reflector structure 52 in housing 24 permits it to be aligned parallel to the tube 30 with a closed point of the V facing tube 30. Adjusting of the respective specular surfaces of the first and second reflector structures 36 and 52 is accomplished by rotating or pivoting the stuctures about the first and the second seams or edges 38 and 58 until the optimum light reflecting relation is achieved among all the reflector surfaces, the housing, and the tube.

Claims Define Invention

The above specific embodiments illustrate only a few of the constructions possible according to the Invention defined by the claims. It is to be understood that the following numbered claims, and not the foregoing Detailed Description, establish the scope and definition of the Invention.

The invention claimed is:

1. A reflector assembly formed for retrofitting an existing fluorescent tube light fixture to improve the light emitting characteristics of the fixture, the light fixture including a housing having generally outwardly directed light reflecting interior surfaces including a top which resides behind the tubes when the tubes are in the fixture, and a first side and a second side both extending outwardly in a similar direction away from opposite sides of the top, the assembly comprising:

(a) a first reflector structure, divided along a common edge into at least two smaller sections, the common edge forming a straight hinge-like joint aligned generally parallel to one of the sets of the opposite outside edges of the reflector structure, one of the opposite outside edges being formed with first means for securing the edge against the housing top and the other outside edge being formed with second means for securing the edge against one of the housing sides, this arrangement leaving the hinge-like joint free to be translated toward and away from the housing top and sides during installation, such that light from the tube hitting the first reflector structure is reflected out of the housing without going back into the tube, and so the light experiences a minimum number of impacts with the reflecting surfaces inside the housing; and (b) a second reflector structure, formed with a base away from which extends a ridge member having a V-shaped cross-section ending in a flexible hinge-like ridge edge, the ridge edge being parallel to the centerline of the fluorescent tube when the tube is mounted in the housing, the second reflector structure being attachable with its base against the housing top and positionable so the ridge edge underlies the tube centerline on a vertical line drawn from the tube centerline to the housing top.

2. The reflector assembly defined in claim 1, wherein the first reflector structure comprises:
a flat elongated rectangular geometry divided by the common edge into at least two smaller sections which also have a flat elongated rectangular geometry, with the common edge being aligned to be parallel to two of the opposed edges of the first reflector structure.

3. The reflector assembly defined in claim 1, wherein the first reflector structure comprises:
a geometric shape formed with a bottom edge alignable to be substantially coplanar with an adjacent bottom edge of a respective housing side when the first reflector structure is secured in the housing, and positionable so the specular surface of the first reflector structure can be mounted at an angle tilted away from the vertical.

4. The reflector assembly defined in claim 1, further including:
a flap, hingeably secured along at least one outside edge of at least one of the first and the second reflector structures, formed to be engaged by a securing means for joining together the reflector structure and the housing.

5. The reflector assembly defined in claim 4, wherein the securing means comprises:
a double face adhesive medium for sandwiching between the flap and the housing.

6. The reflector assembly defined in claim 4, further including:
at least one hinged access door, formed into at least one of the first and the second reflector structures toward an outside edge thereof proximate the flap, the door being formed to provide access to the flap at least while the flap is being joined to the housing.

7. The reflector assembly defined in claim 1, wherein:
the first and the second reflector structures are formed to have specular surfaces alignable to face the tube when the reflector structures are secured in the housing.

8. The reflector assembly defined in claim 1, wherein:
the first and the second reflector structures, when installed in the housing, are separated by an interior housing non-specular surface which has a reflective light diffusing face.

9. The reflector assembly defined in claim 1, wherein:
the first and the second reflector surfaces are joined together along a common integrating edge member and the like to form a single integrated reflector structure.

10. The reflector assembly defined in claim 1, wherein:
the housing top and sides, the first reflector structure surfaces the outside edges, the common edge, the second reflector structure surfaces, the base, the ridge edge, and the fluorescent tube are all alignable to be parallel to one another.

11. The reflector assembly defined in claim 1, wherein the second reflector structure comprises:
a specular surface overlying a plastic strip.

12. The reflector assembly defined in claim 1, wherein the second reflector structure comprises:
an elongated extruded plastic strip having a specular surface.

13. The reflector assembly defined in claim 1, wherein:
the second reflector structure is formed to have at least two ridge members each having a V cross-section ending at an outermost ridge edge each parallel to the tube centerline.

14. The reflector assembly defined in claim 13, wherein:
the two ridge members have substantially identical cross-sections, and are spaced apart an equal distance on opposite sides of a vertical line running from the tube centerline to the housing top.

15. The reflector assembly defined in claim 1, further including:
a third reflector structure, substantially identical to the first reflector structure, constructed to fit into a portion of the housing opposite the first reflector structure, and formed to be secured into the housing with third means for securing which is substantially identical to the first means for securing the first reflector structure in the housing.

16. The reflector assembly defined in claim 1, wherein:
the outside edge of the first reflector structure is connectable to an outside free edge of one of the housing sides so the outermost reflecting face of the first reflector structure directs the reflected light to intersect the horizontal at an angle of greater than about 30°, such that a horizontally disposed translucent light diffuser will not reflect the light back up into the housing.

17. The reflector assembly defined in claim 1, wherein:
the reflector structures are fabricated from a specular surface overlying a corrogated board-like base material.

18. The reflector assembly defined in claim 1, wherein:
at least one of the hinge-like joints formed along the common edge of the first reflector structure, and the hinge-like ridge edge formed in the top of the V-shaped second reflector structure, is flexible enough to permit the reflecting surfaces on either side of the respective edge to be pivoted with respect to each other, so the optimum reflector configuration can be determined for the shape of a particular fixture housing at the time the reflector structure is installed in a light fixture.

19. A reflector assembly formed for retrofitting an existing fluorescent tube light fixture to improve the light emitting characteristics of the fixture, the light fixture including a housing having generally outwardly directed light reflecting interior surfaces including a top which resides behind the tubes when the tubes are in the fixture, the assembly comprising:
(a) a first reflector structure formed into a single flat reflecting face having a first outside edge and a second outside edge, the first outside edge being formed with hingeable first means for securing the first outside edge against a first portion of the housing top and the second outside edge being formed with hingeable second means for securing the second outside edge against a second portion of the housing top, this arrangement permitting the angle of the reflector face to be adjusted during installation with respect to the tube for optimum light reflection; and
(b) a second reflector structure formed with a base away from which extends a ridge member having a V-shaped cross-section ending in a flexible hinge-like ridge edge, the ridge edge being parallel to the centerline of the fluorescent tube when the tube is mounted in the housing, the second reflector structure being attachable with its base against the housing top and positionable so the ridge edge underlies the tube centerline on a vertical line drawn from the tube centerline to the housing top.

20. The reflector assembly defined in claim 19, wherein the second means for securing includes:
an elongated leg portion hingeably secured at its outside end remote from the second portion of the housing top to the second outside edge, so the first reflector structure is supported entirely by the housing top.

21. A reflector assembly formed for retrofitting an existing fluorescent tube light fixture to improve the light emitting characteristics of the fixture, the light fixture including a housing having generally outwardly directed light reflecting interior surfaces including a top which resides behind the tubes when the tubes are in the fixture, and a first side and a second side both extending outwardly in a similar direction away from opposite sides of the top, the assembly comprising:
(a) a first reflector structure, divided along a common edge into at least two smaller sections, the common edge forming a straight hinge-like joint aligned generally parallel to the centerline of the reflector structure, one of the opposite outside edges being formed with first means for securing the edge against the housing top and the other outside edge being formed with second means for securing the edge against one of the housing sides, this arrangement leaving the hinge-like joint free to be translated toward and away from the housing top and sides during installation, such that light from the tube hitting the first reflector structure is reflected out of the housing without going back into the tube, and so the light experiences a minimum number of impacts with the reflecting surfaces inside the housing; and (b) a second reflector structure, formed with a base away from which extends a ridge member having a V-shaped cross-section ending in a flexible hinge-like ridge edge, the ridge edge being parallel to the centerline of the fluorescent tube when the tube is mounted in the housing, the second reflector structure being attachable with its base against the housing top and positionable so the ridge edge underlies the tube centerline on a vertical line drawn from the tube centerline to the housing top.

22. An inexpensive, lightweight, flexible reflector assembly for reflecting light generated by an elongated fluorescent light tube, comprising:
(a) an elongated rectangular housing, formed with a base away from which extend in the same general direction a first side and a second side positioned on opposite regions of the base, the housing being formed to receive and hold at least one fluorescent tube in parallel relation with the base and the sides;
(b) a first reflector having a flat elongated rectangular shape, divided into at least a first and a second smaller rectangular section along a hinge-like seam running parallel to the opposite edges of the first reflector, the seam permitting the smaller sections to be pivoted about the seam with respect to each other for the light reflection desired, the first reflector being formed for adjustable mounting within the housing with one of the first and the second smaller sections mounted to the base and with the remaining section mounted to a side;
(c) a second reflector, formable into a member having a V-shaped cross-section with a joining side attachable to the housing base and two reflecting sides extending away from the joining side to end in a ridge edge operable as a hinge for pivoting the two reflector sides with respect to each other for the light reflection desired, the second reflector being formed for positioning behind the tube with the ridge edge parallel to the centerline;
(d) securing means for detachably mounting the reflectors to the housing; and
(e) the reflectors being fabricated from a specular material formed to overly a corrugated board material and the like, so the reflectors are inexpensive, lightweight and flexible.

23. The reflector assembly defined in claim 22, wherein the second reflector comprises:
at least two V-shaped members, each positionable on opposite sides of and an equal distance away from a vertical line drawn from the tube centerline to the housing base.

24. The reflector assembly defined in claim 22, wherein the securing means comprises:
(a) at least one flap, coupled with a hinge-like flap seam to at least one of the reflector surfaces contacting the housing, the flap being foldable to be sandwiched between the respective reflector surface and the housing;
(b) a plurality of double faced adhesive tape sections, formed for sandwiching between the flaps and the housing, to mount the reflectors in the housing; and
(c) a plurality of access doors, formed in at least one of the reflector surfaces adjacent the flap and the tape, to permit hand access through the reflectors to press the flaps and the tape into bonding contact with the housing, this arrangement permitting the reflectors to be installed in and removed from the housing without requiring the use of tools such as screwdrivers, power drills, screws and the like.

25. The reflector assembly defined in claim 22, further including:
a third reflector, substantially identical in construction to the first reflector, and mountable in the housing opposite the first reflector in a manner substantially identical to the manner used to mount the first reflector.

26. The reflector assembly defined in claim 25, wherein:
(a) the first and the second reflectors are hingeably joined along a respective first and second integrating seam to the respective first and second opposite sides of a first integrating member; and
(b) the second and the third reflectors are hingeably joined along a respective third and fourth integrating seam to the respective third and fourth opposite sides of a second integrating member, so all three of the reflectors together form one integrated composite reflector.

27. The reflector assembly defined in claim 22, wherein:
the various intercept angles between the various reflector surfaces, and between the reflector surfaces and the housing, are selectable to be determined in the field to maximize the amount of light reflected out of the housing and to minimize the amount of light experiencing multiple collisions with the reflector surfaces and the tube.

28. The reflector apparatus defined in claim 27, wherein:
the reflector surfaces of the second reflector intercept the housing top at an angle of about 30°.

29. The reflector apparatus defined in claim 27, wherein:
the reflector surfaces of the second reflector intercept the housing top at an angle of about 45°.

30. An improved reflector assembly particularly useful for retrofitting a light fixture having an elongated rectangular housing in which is longitudinally mounted at least one fluorescent tube, the light fixture being positioned to illuminate a long narrow area such as a hallway and the like, the improved reflector comprising:
(a) a reflector structure which is:
(i) formed into a plurality of U-shaped sections joined together in series in accordion-like fashion;
(ii) flexible to be expandable and compressible along the axes of both the housing and the tube; and
(iii) positionable longitudinally in the housing in light reflecting relation with the tube with the relecting surfaces of the U-shaped sections defined by a plurality of flexible hinge-like joints aligned to be substantially transversely perpendicular to the horizontal axes of both the housing and the tube; and
(b) mounting means, formed for removably securing the reflector in the housing.

31. The reflector assembly defined in claim 30, wherein the reflector structure comprises:
a lightweight flexible cardboard-like base material and the like which is substantially covered on at least one surface with a specular material.

32. The reflector assembly defined in claim 30, wherein the reflector structure comprises:

a molded plastic material having a specular surface.

33. The reflector assembly defined in claim 30, wherein the mounting means comprises:
 a double face adhesive material, formed for sandwiching between the reflector structure and the housing.

34. A reflector assembly formed for retrofitting an existing fluorescent tube light fixture to improve the light emitting characteristics of the fixture, the light fixture including a housing having generally outwardly directed light reflecting interior surfaces including a top which resides behind the tubes when the tubes are in the fixture, and a first side and a second side both extending outwardly in a similar direction away from opposite sides of the top, the assembly comprising:
 (a) a first reflector structure, formed into a flat rectangular shape having a pair of opposed first and second parallel edges, to each of which edges is hingeably connected a securing means for mounting the first reflector structure in the housing with its reflecting surface positionable to be parallel to the tube and angled away from the vertical plane, and for mounting the first reflector structure to leave exposed a portion of the interior surface of the housing: and
 (b) a second reflector structure formed with a base away from which extends a ridge member having a V-shaped cross-section ending in a flexible hinge-like ridge edge, the ridge edge being parallel to the centerline of the fluorescent tube when the tube is mounted in the housing, the second reflector structure being attachable with its base against the housing top and positionable so the ridge edge underlies the tube centerline on a vertical line drawn from the tube centerline to the housing top.

35. The reflectors of any of claims 1 through 34, wherein:
 the reflectors are formed into flat geometries for transporting to a field location for subsequent folding into reflecting surfaces having desired angular relations for installation into the housing of the light fixture.

36. An inexpensive, simple, tool-free method for improving the light reflecting capability of a light fixture, including an elongated rectangular housing for holding elongated fluorescent tubes longitudinally mounted in the housing, comprising the steps of:
 (a) forming a first and a second reflector structure by securing a specular material over a lightweight cardboard-like base material;
 (b) folding a first reflector to have at least two central rectangular sections having specular surfaces joined along a hinge-like first seam which is parallel to at least one pair of the free edges of the two central rectangular sections;
 (c) adjustably mounting the first reflector structure in the housing to be aligned with the two free edges which are parallel with the first seam and which are also parallel with the sides and the top of the housing, so one of the free edges is secured to the top and the other of the free edges is secured to a respective side, and the first seam is not secured and is free to move toward and away from the top and the side;
 (d) folding the second reflector structure to have at least one V-shaped cross-section, with the closed point of the V forming a hinge-like second seam;
 (e) adjustably mounting the second reflector structure in the housing to be aligned parallel to the tube with the closed point of the V facing the tube; and
 (f) adjusting the respective specular surfaces of the first and the second reflector structures by rotating the structures about the first and the second seam until the optimum light reflecting relation is achieved among all the reflector surfaces, the housing, and the tube.

* * * * *